United States Patent [19]
Willson

[11] Patent Number: 5,152,173
[45] Date of Patent: Oct. 6, 1992

[54] OPTICAL SENSING SYSTEMS

[75] Inventor: Jolyon P. Willson, Andover, England

[73] Assignee: Schlumberger Industries Limited, Farnborough, England

[21] Appl. No.: 629,310

[22] Filed: Dec. 18, 1990

[30] Foreign Application Priority Data

Dec. 29, 1989 [GB] United Kingdom ............... 8929328

[51] Int. Cl.$^5$ .......................... G01L 9/00; G01L 11/00
[52] U.S. Cl. ....................................... 73/702; 73/705; 250/231.19
[58] Field of Search ........... 73/702, 704, 705, DIG. 1; 250/227.21, 231.1, 231.19

[56] References Cited

U.S. PATENT DOCUMENTS

| 4,897,542 | 1/1990 | Dakin et al. | 250/227.21 |
| 4,933,545 | 6/1990 | Saaski et al. | 250/231.19 |
| 4,972,076 | 11/1990 | Willson | 73/862.59 |

FOREIGN PATENT DOCUMENTS 0244087 11/1987 European Pat. Off.
2182433 5/1987 United Kingdom.

Primary Examiner—Donald O. Woodiel
Attorney, Agent, or Firm—Sanford J. Asman

[57] ABSTRACT

In an optically-excited micromachined silicon pressure sensor comprising a resonantly vibrating beam mounted on a diaphragm, vibration of the beam is sensed optically via the same optical fibre through which the optical excitation signal is applied to the sensor. The end of the fibre and the beam are arranged to define a cavity or gap whose width varies with vibration of the beam and which behaves as a Fabry-Perot cavity: thus light from the fibre is directed onto the beam and then reflected back to the fibre, the reflected light being modulated at the frequency of vibration of the beam. In order to overcome the difficulty of setting the gap or cavity width at an optimum value for light of a given wavelength, light of two different wavelengths is used to sense the vibrations, the wavelengths being selected such that the phase difference produced by the gap for one wavelength differs from that for the other wavelength by roughly 90°.

7 Claims, 1 Drawing Sheet

OPTICAL SENSING SYSTEMS

This invention relates to optical sensing systems, and is more particularly, but not exclusively, concerned with optical sensing systems of the type comprising a solid state sensor having a resonantly vibrating element whose frequency of vibration varies in dependence on a parameter to be sensed by the system, for example, pressure.

Sensors of this general type are described in our United Kingdom Patent Nos. 2,235,773 and 2,223,311 (which corresponds to U.S. Pat. No. 4,972,076) and in U.S. Pat. No. 5,060,526 which issued on Oct. 29, 1991 to Phillip W. Barth, et al., entitled LAMINATED SEMICONDUCTOR SENSOR WITH VIBRATING ELEMENT AND ASSOCIATED METHOD AND PRODUCT, the disclosure of which is hereby incorporated by reference.

In sensors of this type, the frequency of vibration of the vibrating element is, or can be, sensed optically, by arranging for the vibration to modulate a light beam which is transmitted to the sensor via an optical fibre. This is typically achieved by arranging the vibrating element to define one wall of a Fabry-Perot cavity, whose other wall is substantially stationary (i.e., not vibrating): thus the cavity may be defined between the end of the aforementioned optical fibre and the vibrating element, or between the vibrating element and some other relatively stationary part of the sensor, eg. a pressure sensing diaphragm on which the vibrating element is supported. This cavity is arranged in the path of the light beam, and produces multiple reflections of it, which when summed, exhibit modulation of the frequency of the vibration of the vibrating element. It can be shown that vibration of a very small amplitude ($<10$ nm) can be sensed using this technique.

In sensors employing this technique for sensing the vibration of the vibrating element, the reflectivity of the cavity walls is typically rather low. So to achieve maximum sensitivity, the basic or mean width of the cavity (i.e., the width of the cavity with the vibrating element at rest) is selected in relation to the wavelength of the light used for sensing the vibration such that the phase difference between the reflections in the cavity is about 90°. However, the width of the cavity can be difficult to establish accurately to a desired value during manufacture of the sensor, and can vary significantly during use of the sensor with parameters such as temperature, to the extent that the sensitivity can become unacceptably low.

It is an object of the present invention to alleviate this problem.

According to the present invention, therefore, there is provided an optical sensing system comprising:

a sensor having a resonantly vibrating element whose frequency of vibration varies in dependence upon a parameter to be sensed by the system;

means for defining with said vibrating element a cavity whose width varies with vibration of the vibrating element;

means for directing a light beam into said cavity for reflection therein, whereby to produce modulation of the beam at the frequency of said vibration;

detection means for detecting the modulated beam;

wherein the detection means is arranged to detect light of first and second wavelengths selected such that the phase difference between reflections for the first wavelength is different from the phase difference between reflections for the second wavelength by an amount significantly different from 0° and from 180°, said amount preferably being approximately 90°.

Advantageously, said light beam directing means comprises an optical fibre, in which case the cavity is preferably defined between the end of the fibre and said vibrating element.

In a preferred embodiment of the invention, the optical sensing system includes a broadband optical source, for example a light emitting diode, for directing a broadband light signal into the optical fibre, and a wavelength division multiplexer for receiving light reflected back along the fibre from the cavity and for selecting said first and second wavelengths therefrom. In this case, the detection means preferably comprises first and second photoelectric devices for receiving light of the first and second wavelengths respectively from the wavelength division multiplexer, first and second differentiation circuits for differentiating the respective output signals produced by the photoelectric devices, first and second multiplying circuits for multiplying the respective output signals produced by the first and second differentiating circuits by the respective output signals produced by the second and first photoelectric devices, a summing circuit for summing the output signals of the multiplying circuits, and an integrating circuit for integrating the output signal of the summing circuit to produce a sensing system output signal modulated at the frequency of vibration of the vibrating element of the sensor.

The invention will now be described, by way of example only, with reference to the accompanying drawings, of which:

Figure 1:
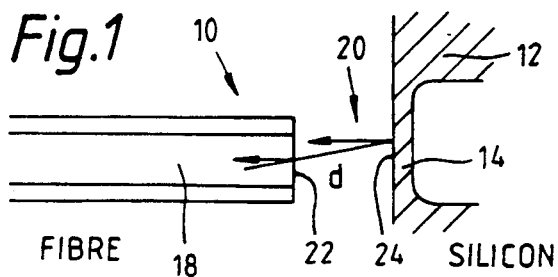
FIG. 1 illustrates very schematically part of a micromachined silicon pressure sensor forming part of an optical sensing system in accordance with the present invention.
Figure 3:
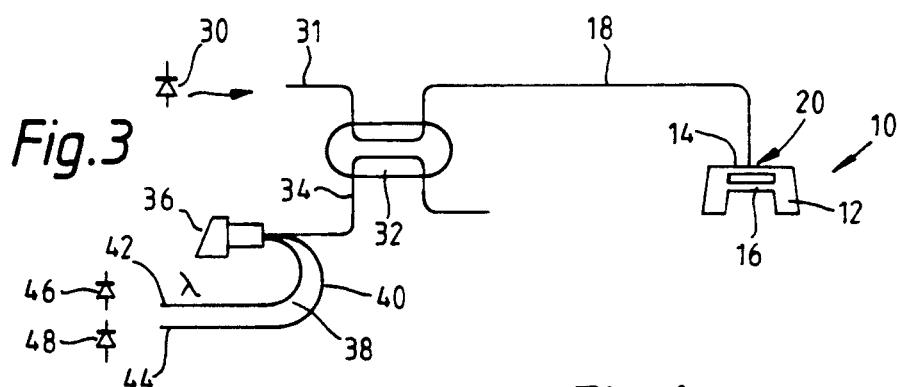
FIG. 3 shows the optical signal paths to and from the sensor in an optical sensing system in accordance with the present invention.

The sensor of FIGS. 1 and 3 is indicated generally at 10, and is of the same general type as the sensors described in the aforementioned United Kingdom and United States patent applications. Thus the sensor 10 comprises a silicon substrate 12 having a resonantly vibratable element in the form of a narrow elongate beam 14 formed therein by micromachining. The beam 14 is supported on a diaphragm 16, such that the tension in the beam varies with pressure applied to the diaphragm, and is excited into resonant vibration optically, by a pulsed light signal which is applied to a suitable region of the sensor 10 via an optical fibre 18, as described in the aforementioned patent applications. The frequency of the vibration of the beam 14 is therefore a function of the pressure applied to the diaphragm 16

The frequency of vibration of the beam 14 is sensed optically, by using the space or gap 20 defined between the end 22 of the optical fibre 18 and the immediately adjacent vibrating region 24 of the sensor 10 (which region is shown for the sake of simplicity in FIGS. 1 and 3 as being part of the beam 14) as a Fabry-Perot cavity. Assuming that the cavity 20 is of width d and the reflectivity of the region 24 of the sensor 10 is quite low (e.g., of the order of 4%), it can be shown that the intensity I of the light reflected back along the fibre 18 is approximated by $$I = 1 + \cos\phi \quad (1)$$

where $\phi$ is the phase shift between reflections, given by $$\phi = \frac{2\lambda n d}{\lambda} \quad (2)$$

Figure 2:
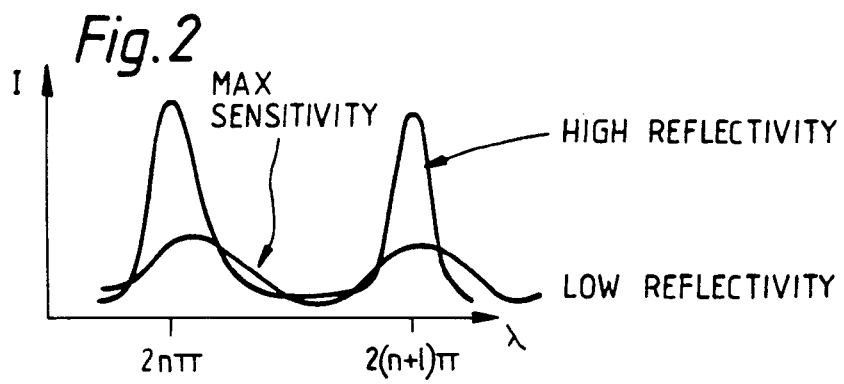
FIG. 2 illustrates the variation of the intensity of the reflected light signal with wavelength for the sensor of FIG. 1.

FIG. 2 shows variations of I with $\lambda$, the wavelength of the light, and it can be seen that the maximum sensitivity to the vibration will be achieved for values of d and $\lambda$ for which $\phi = 90°$, i.e. where the slope of the curve is maximum (and approximately linear). But as explained hereinabove, d can vary significantly in use, e.g., due to temperature changes, and these variations in d can reduce the sensitivity to unacceptably low values (i.e., when $\phi$ approaches 0° or 180°). This problem is overcome by the sensing system of FIG. 3.

Thus in the sensing system of FIG. 3, broadband light from a light emitting diode (LED) 30, typically of the FWHM type with a 50 nm wavelength spread, is directed into the end of the fibre 18 remote from the sensor 10 via one port 31 of an optical coupler 32, and the light reflected back along the fibre 18 exits the optical coupler via another port 34 thereof, which is coupled to the input of a wavelength division multiplexer (WDM) 36. The WDM 36, which uses a graded-index rod lens and a glass wedge grating assembly to disperse the broadband light incident on its input, has two outputs 38, 40 to which it transmits light at the wavelengths $\lambda$ and $\lambda + \Delta\lambda$, selected such that $$\phi\lambda \approx \phi\lambda + \Delta\lambda + 90°$$

The outputs 38, 40 of the WDM 36 are connected via respective optical fibres 42, 44 to respective photodiodes 46, 48 whose outputs, after removal of the respective DC components, vary with $\cos\phi\lambda$ and $\cos\phi\lambda + \Delta\lambda$. But $\cos\phi\lambda + \Delta\lambda = \sin\phi\lambda$ (because of the 90° phase difference), so that the outputs of the photodiodes 46, 48 effectively vary with $\cos\phi$ and $\sin\phi$ respectively.

Figure 4:
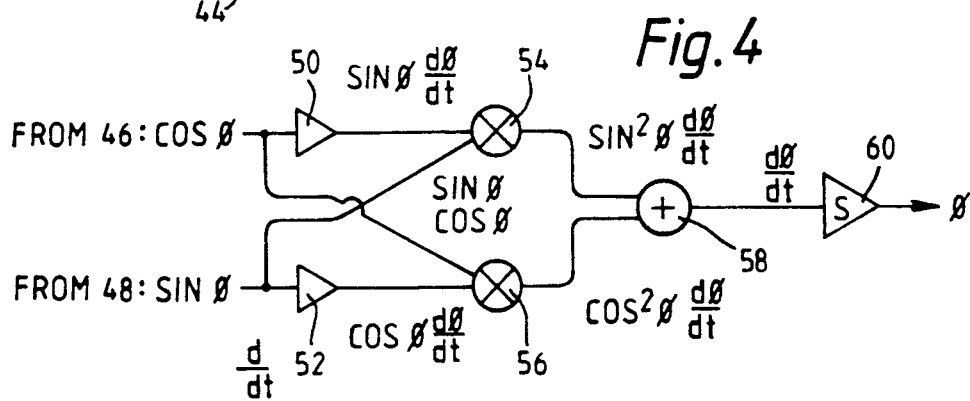
FIG. 4 shows an electronic signal processing circuit for use with the optical sensing system of FIG. 3.

The output signals of the photodiodes 46, 48 can therefore be processed as shown in FIG. 4, by applying them to respective differentiating circuits 50, 52 whose respective output signals, $\sin\phi d\phi/dt$ and $\cos\phi d\phi/dt$, are applied to respective multipliers 54, 56 to be cross multiplied, by the output signals of the photodiodes 48, 46 respectively, to form respective output signals $\sin^2\phi d\phi/dt$ and $\cos^2\phi d\phi/dt$. The respective output signals of the multipliers 54, 56 are summed in a summing circuit 58, thus producing an output signal $d\phi/dt$, which after integration in an integration circuit 60, yields an overall output signal proportional to $\phi$. This approximately fixed phase difference output signal is of course modulated at the resonant frequency of the vibrating region 24 of the sensor 10.

The optical sensing system of the present invention has a number of advantages. In particular, the use of a laser diode with complex current and temperature stabilisation circuitry is not required. The single LED used instead is relatively inexpensive, and its low coherence length avoids the modal noise problems associated with the use of a laser and multimode fibre, and higher temperature operation, say up to 120° C., is possible, compared with 85 C for a typical laser.

Several modifications can be made to the described embodiment of the invention. In particular, the circuitry of FIG. 4 can be replaced by a circuit comprising first and second squaring circuits connected to receive and square the respective outputs produced by the photodiodes 46, 48, a summing circuit connected to receive and sum the respective outputs of the squaring circuits, and a phase locked loop circuit arranged to phase lock the output of a voltage-controlled oscillator (VCO) to the output signal from the summing circuit; in this case, the output of the VCO is modulated at twice the frequency of vibration of the vibrating region 24 of the sensor 10, and can be used, after frequency division by two, to drive the LED 30. Alternatively, the electronic signal processing can be performed digitally. Finally, the LED 30 can be replaced by two laser diodes operating at the respective wavelengths selected by the WDM 36.

I claim:

1. An optical sensing system comprising:
   a sensor having a resonantly vibrating element whose frequency of vibration varies in dependence upon a parameter to be sensed by the system;
   means for defining with said vibrating element a cavity whose width varies with vibration of the vibrating element;
   a broadband optical source for directing a broadband light signal into said cavity for reflection therein, whereby to produce modulation of said broadband light signal at the frequency of said vibration;
   detection means for detecting said broadband light signal;
   wherein the detection means is arranged to detect light of first and second wavelengths selected such that the phase difference between reflections for the first wavelength is different from the phase difference between reflections for the second wavelength by an amount significantly different from 0° and from 180°.

2. An optical sensing system as claimed in claim 1, wherein said amount is approximately 90°.

3. An optical sensing system as claimed in claim 1, wherein said light beam directing means includes an optical fibre arranged to receive said broadband light signal from said broadband optical source, and the cavity is defined between the end of the fibre and said vibrating element.

4. An optical sensing system as claimed in claim 3, further comprising a wavelength division multiplexer for receiving light reflected back along the fibre from the cavity and for selecting said first and second wavelengths therefrom.

5. An optical sensing system as claimed in claim 4, wherein the detection means comprises first and second photoelectric devices for receiving light of the first and second wavelengths respectively from the wavelength division multiplexer, first and second differentiation circuits for differentiating the respective output signals produced by the photoelectric devices, first and second multiplying circuits for multiplying the respective output signals produced by the first and second differentiating circuits by the respective output signals produced by the second and first photoelectric devices, a summing circuit for summing the output signals of the multiplying circuits, and an integrating circuit for integrating the output signal of the summing circuit to produce a sensing system output signal modulated at the frequency of vibration of the vibrating element of the sensor.

6. An optical sensing system as claimed in claim 4, wherein the detection means comprises first and second photoelectric devices for receiving light of the first and second wavelengths respectively from the wavelength division multiplexer, first and second squaring circuits for squaring the respective output signals produced by the photoelectric devices and a summing circuit for summing the output signals from the squaring circuits to produce a sensing system output signal modulated at the frequency of vibration of the vibrating element of the sensor.

7. An optical sensing system as claimed in claim 1, wherein the broadband source comprises a light emitting diode.

* * * * *